United States Patent
Chang et al.

(10) Patent No.: US 9,869,971 B2
(45) Date of Patent: Jan. 16, 2018

(54) HOLOGRAM GENERATION METHOD AND APPARATUS

(71) Applicant: Electronics and Telecommunications Research Institute, Daejeon (KR)

(72) Inventors: Eun Young Chang, Daejeon (KR); Soo Hyun Lee, Daejeon (KR); Jin Woong Kim, Daejeon (KR); Tae One Kim, Daejeon (KR); Kyung Ae Moon, Daejeon (KR); Joong Ki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/987,287

(22) Filed: Jan. 4, 2016

(65) Prior Publication Data
US 2016/0195850 A1 Jul. 7, 2016

(30) Foreign Application Priority Data
Jan. 5, 2015 (KR) .................. 10-2015-0000504

(51) Int. Cl.
*G03H 1/22* (2006.01)
*G03H 1/08* (2006.01)
*G03H 1/02* (2006.01)

(52) U.S. Cl.
CPC ......... *G03H 1/2294* (2013.01); *G03H 1/0808* (2013.01); *G03H 2001/0224* (2013.01);
(Continued)

(58) Field of Classification Search
CPC .. G03H 1/00; G03H 1/06; G03H 1/08; G03H 1/10268; G03H 1/2294; G03H 1/0443; G03H 1/0808; G03H 1/26; G03H 1/04–1/0406; G03H 1/22; G03H 1/28; G03H 1/0891; G03H 1/0866; G03H 1/041; G03H 1/0476; G03H 1/16; G03H 5/00; G03H 2001/0224; G03H 2001/0228; G03H 2001/2239; G03H 2001/2236; G03H 2001/0445; G03H 2001/0447;
(Continued)

(56) References Cited

U.S. PATENT DOCUMENTS

2003/0063226 A1    4/2003  Gibbon et al.
2008/0204833 A1*   8/2008  Rosen .................. G02B 5/1876
                                                                  359/9
(Continued)

FOREIGN PATENT DOCUMENTS

KR    1020130086437 A    8/2013

*Primary Examiner* — Bumsuk Won
*Assistant Examiner* — Tamara Y Washington
(74) *Attorney, Agent, or Firm* — William Park & Associates Ltd.

(57) ABSTRACT

Provided is a hologram generation method including receiving three-dimensional (3D) data information, determining a first projection position onto which the 3D data information is projected on a hologram plane corresponding to a first spatial light modulator (SLM), and a second projection position onto which the 3D data information is projected on a hologram plane corresponding to a second SLM, generating a first Fresnel zone plate (FZP) pattern corresponding to the first projection position, and determining the first FZP pattern to be an FZP pattern corresponding to the second projection position.

15 Claims, 5 Drawing Sheets

(52) U.S. Cl.
CPC .............. *G03H 2001/2236* (2013.01); *G03H 2001/2239* (2013.01); *G03H 2210/30* (2013.01); *G03H 2225/60* (2013.01)

(58) Field of Classification Search
CPC ... G03H 2001/0413; G03H 2001/0415; G03H 2001/0419; G03H 2225/00; G03H 2225/10–2225/13; G03H 2225/22; G03H 2225/25; G03H 2225/30; G03H 2225/60; G03H 2225/61; G03H 2226/00; G03H 2226/13; G03H 2223/23; G03H 2210/00; G03H 2210/10; G03H 2210/20; G03H 2210/22; G03H 2210/30; G02B 5/1876
USPC .................................................. 359/9, 22, 23
See application file for complete search history.

(56) References Cited

U.S. PATENT DOCUMENTS

| | | | |
|---|---|---|---|
| 2012/0050832 A1* | 3/2012 | Rosen | G03H 1/0443 359/25 |
| 2014/0049451 A1* | 2/2014 | Sugiyama | G03H 1/0808 345/8 |
| 2014/0192146 A1 | 7/2014 | Park et al. | |
| 2014/0211286 A1 | 7/2014 | Nam et al. | |
| 2014/0293385 A1* | 10/2014 | Smithwick | G03H 1/26 359/9 |

* cited by examiner

HOLOGRAM GENERATION METHOD AND APPARATUS

CROSS-REFERENCE TO RELATED APPLICATION

This application claims the priority benefit of Korean Patent Application No. 10-2015-0000504, filed on Jan. 5, 2015, in the Korean Intellectual Property Office, the disclosure of which is incorporated herein by reference.

BACKGROUND

1. Field of the Invention

Example embodiments of the present invention relate to a hologram generation method and apparatus, and more particularly, to a method and apparatus for generating a wide viewing angle hologram based on an inter-viewpoint redundancy.

2. Description of the Related Art

With a recent invigoration in the three-dimensional (3D) image industry and 3D display industry, active research is being conducted on holography technology hailed as an ultimate 3D image. In the holography technology, phase information on an object may be recorded through an interference of two types of light, for example, light waves, including a reference wave and an object wave. The holography technology may be characterized in enabling a user to view a 3D image without experiencing a visual fatigue, and providing an outstanding performance in terms of, for example, a depth effect, when compared to other methods of realizing a 3D image.

Also, remarkably growing digital technology and computing technology has inspired digital holography technology to be developed in contrast to a generally used analog method. A computer-generated hologram (CGH) performing the interference of the object wave and the reference wave ensures hologram generation without using an optical method. A holographic display has an issue of a spatial light modulator (SLM) having a relatively narrow viewing angle, for example, 2° to 3° and thus, various methods have been applied to solve the issue.

As an example, since a single SLM is insufficient to view a reconstructed image through both eyes, a binocular holographic display apparatus using two SLMs has been provided. In this example, the binocular holographic display apparatus may be implemented using two SLMs to display a hologram pattern image for a left viewpoint and a hologram pattern image for a right viewpoint.

As another example, to increase a viewing angle in a horizontal direction, a holographic display system has been implemented by horizontally arranging five transmission type liquid crystal (LC)-SLMs. As still another example, a multi-SLM holographic display system has been implemented by tiling six high resolution phase-only SLMs in a 3×2 form to increase a size of hologram or a viewing angle such that a user feels comfortable while viewing a 3D image.

In the general technology for implementing a wide viewing angle hologram by configuring a plurality of SLMs in an M×N matrix form, a calculation complexity may increase in a process of generating a hologram pattern for M×N viewpoints to be represented using the SLMs although the increased size of hologram or the increased viewing angle is provided. The aforementioned phenomenon may be an issue in terms of an application requiring a real-time processing.

SUMMARY

An aspect of the present invention provides a hologram generation method and apparatus for generating a hologram at a high speed by accumulating a hologram pattern for a plurality of viewpoints. By using the hologram method and apparatus, a hologram generation may be performed at a high speed through an accumulation of a hologram pattern based on a redundancy between viewpoints without need to generate a new pattern.

According to an aspect of the present invention, there is provided a hologram generation method including receiving three-dimensional (3D) data information, determining a first projection position onto which the 3D data information is projected on a hologram plane corresponding to a first spatial light modulator (SLM), and a second projection position onto which the 3D data information is projected on a hologram plane corresponding to a second SLM, generating a first Fresnel zone plate (FZP) pattern corresponding to the first projection position, and determining the first FZP pattern to be an FZP pattern corresponding to the second projection position.

The method may further include verifying a visibility of the 3D data information for the hologram plane corresponding to each of the first SLM and the second SLM.

The 3D data information may include at least one of information associated with a scene and a target object to be represented by a holographic 3D image.

The method may further include verifying whether FZP patterns are generated for all SLMs corresponding to the 3D data information.

The method may further include setting, when a third SLM for which an FZP pattern is not generated is present, a reference SLM corresponding to the third SLM, and applying an FZP pattern of the reference SLM to be the FZP pattern of the third SLM.

The reference SLM may be an adjacent SLM of the third SLM.

Each of the first SLM and the second SLM may correspond to a different viewpoint.

According to another aspect of the present invention, there is also provided a hologram generation apparatus including an inputter configured to receive 3D data information, a plane projector configured to determine a first projection position onto which the 3D data information is projected on a first SLM and a second projection position onto which the 3D data information is projected on a second SLM, and an FZP pattern generator configured to generate a first FZP pattern corresponding to the first projection position, and determine the first FZP pattern to be an FZP pattern corresponding to the second projection position.

The plane projector may be configured to verify a visibility of the 3D data information for the hologram plane corresponding to each of the first SLM and the second SLM.

The 3D data information may include at least one of information associated with a scene and a target object to be represented by a holographic 3D image.

The FZP pattern generator may be configured to verify whether FZP patterns are generated for all SLMs corresponding to the 3D data information.

When a third SLM for which an FZP pattern is not generated is present, the FZP pattern generator may be configured to set a reference SLM corresponding to the third SLM, and apply an FZP pattern of the reference SLM to be the FZP pattern of the third SLM.

The reference SLM may be an adjacent SLM of the third SLM.

Each of the first SLM and the second SLM may correspond to a different viewpoint.

According to still another aspect of the present invention, there is also provided a hologram generation method including receiving 3D data information, calculating 3D data visualized on a hologram plane corresponding to each SLM for indicating a corresponding viewpoint, calculating a projection position of the visualized 3D data on the hologram plane, and applying an FZP pattern of a hologram plane of a pre-processed reference viewpoint, to a hologram plane of a non-processed viewpoint.

According to yet another aspect of the present invention, there is also provided a hologram generation method including generating an FZP pattern for 3D data, and performing a calculation by accumulating the generated FZP pattern on a hologram plane corresponding to a different viewpoint based on a projection position and whether a visibility is present.

According to further another aspect of the present invention, there is also provided a hologram generation method including verifying whether 3D data is visualized on a hologram plane for each SLM, and accumulating, when the 3D data is verified to be visualized, an FZP pattern of the 3D data by changing a position of the FZP pattern based on a projection position on the hologram plane for each SLM.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
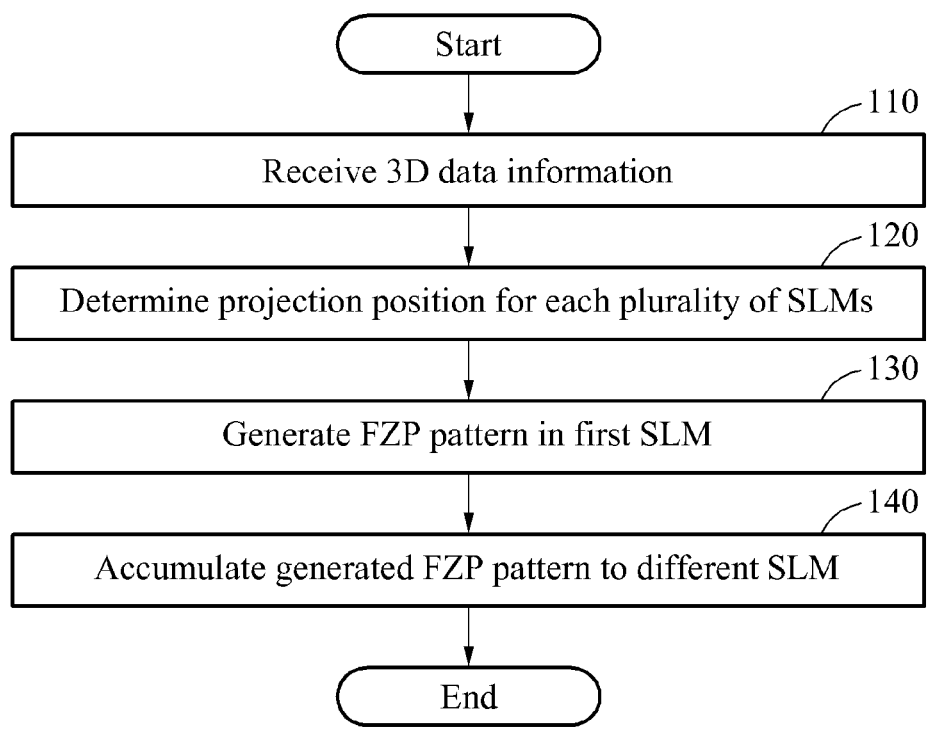
FIG. 1 is a flowchart illustrating a hologram generation method according to an example embodiment of the present invention.

Reference will now be made in detail to exemplary embodiments of the present invention, examples of which are illustrated in the accompanying drawings. However, it should be understood that these embodiments are not construed as limited thereto. Like reference numerals in the drawings denote like elements.

The terms used in this specification were selected to include current, widely-used, general terms, in consideration of the functions of the present invention. However, the terms may represent different meanings according to the intentions of the skilled person in the art or according to customary usage, the appearance of new technology, etc.

In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

A method of generating a wide viewing angle hologram based on an inter-viewpoint redundancy according to an aspect of the present invention may include a three-dimensional (3D) data input operation in which three-dimensional (3D) data information to be represented is received, a 3D data projection operation in which a calculation is performed on 3D data to check whether it is visualized by projecting the received 3D data information onto a hologram plane corresponding to each spatial light modulator (SLM) for indicating each viewpoint, and get a projection position of the 3D data on the hologram plane, a Fresnel zone pattern (FPZ) pattern generation and accumulation operation in which an FPZ pattern is generated for non-processed 3D data among visualized 3D space data relative to a reference viewpoint, the generated FZP pattern is accumulated and calculated to a hologram plane related to each viewpoint based on the projection position and whether a visibility is present with respect to all the other viewpoints except the reference viewpoint and pre-processed viewpoints, and the generating and the accumulating and calculating are repetitively performed until all the visualized 3D data relative to the reference viewpoint is processed, a verification operation in which whether all of the viewpoints are processed is verified, and a reference viewpoint setting operation in which one of non-processed viewpoints is set as the reference viewpoint and the FZP pattern generation and accumulation operation and the verification operation are repetitively performed when all the viewpoints are verified not to be processed.

An FPZ pattern generation and accumulation operation according to another aspect of the present invention may include an FZP generation operation in which an FZP pattern is generated for one item of 3D data, an FPZ calculation and accumulation operation in which the generated FZP pattern is accumulated and calculated for a hologram plane related to each viewpoint based on a projection position and whether a visibility is present, and an operation in which the FZP generation operation and the FZP calculation and accumulation operation are repetitively performed until all 3D data visualized relative to a reference viewpoint is processed.

An FZP calculation and accumulation operation according to still another aspect of the present invention may include a verification operation in which 3D data is to be visualized on a hologram plane corresponding to each SLM, and an accumulation operation in which an FZP pattern of a corresponding 3D data is moved to be accumulated based on a projection position on the hologram plane for each SLM when the 3D data of the verification operation is verified to be visualized on the hologram plane corresponding to each SLM.

A wide viewing angle hologram generation apparatus based on an inter-viewpoint redundancy according to yet another aspect of the present invention may include a 3D data inputter configured to receive 3D data information to be represented, a hologram plane projector configured to calculate visualized 3D data by projecting 3D data included in the received 3D data information onto a hologram plane corresponding to each viewpoint and a projection position of the 3D data on the hologram plane, and an FZP generator and accumulator configured to generate an FZP pattern for non-processed 3D data among visualized 3D data relative to a reference viewpoint, and calculate and accumulate the FZP pattern to the hologram plane corresponding to each viewpoint based on the projection position and whether a visibility is present with respect to all viewpoints other than the reference viewpoint and pre-processed viewpoints.

Hereinafter, exemplary embodiments will be described in detail with reference to the accompanying drawings.

FIG. 1 is a flowchart illustrating a hologram generation method according to an example embodiment of the present invention.

In operation 110, the hologram generation method may receive 3D data information. The 3D data information may include at least one of information associated with a scene and a target object to be represented by a holographic 3D image.

In general, computer-generated holography (CGH) technology may apply color information, for example, red (R), green (G), and blue (B), and 3D information, for example, X, Y, and Z, on the scene or the target object to be represented, to generate a hologram through a computer simulation. In this example, a type of 3D data received as an input may include a multi-view image and a stereoscopic image including color information and depth/disparity information, or 3D graphics model of the scene and the target object. In an example, when the type of the received 3D data is the 3D graphics model, a vertex information list expressed based on color information, for example, R, G, and B, and 3D information, for example, X, Y, and Z, on a vertex included in the 3D graphics model may be inputted. Also, when the type of the received 3D data is the multi-view image or the stereoscopic image including color information and depth/disparity information, an actual image-based 3D point light source list expressed based on color information, for example, R, G, and B, and 3D information, for example, X, Y, and Z, calculated through a conversion into 3D information using a camera parameter may be inputted. In another example, when the type of the received 3D data is the 3D graphics model, a depth image and a color image rendered based on a mesh model provided in a polygonal configuration including a triangular configuration may be inputted. Also, when the type of the received 3D data is the multi-view image or the stereoscopic image including color information and depth/disparity information, the multi-view image or the stereoscopic image including the color information and the depth/disparity information may be directly inputted without performing a conversion. Since a method of converting an image such as the multi-view image and the stereoscopic image including color information and depth/disparity information into the 3D information using the camera parameter is a known art in a technical field to which the present disclosure pertains, repeated descriptions will be omitted for increased clarity and conciseness.

In operation 120, the hologram generation method may project the received 3D data onto a hologram plane for each SLM for indicating each viewpoint. The hologram generation method may calculate 3D data to be visualized and a projection position on a hologram plane of the 3D data.

When M×N SLMs are used, hologram planes corresponding to M×N viewpoints may be defined and thus, the hologram generation method may project all of the 3D s M×N times.

The hologram generation method may verify whether a visibility is present. For example, the verification may be performed to verify whether the 3D data is to be visualized on each of the hologram planes or invisible due to other 3D data obscuring the 3D data. When the 3D data is verified to be visualized, the hologram generation method may calculate a position onto which the 3D data is projected on a corresponding hologram plane.

Figure 2:
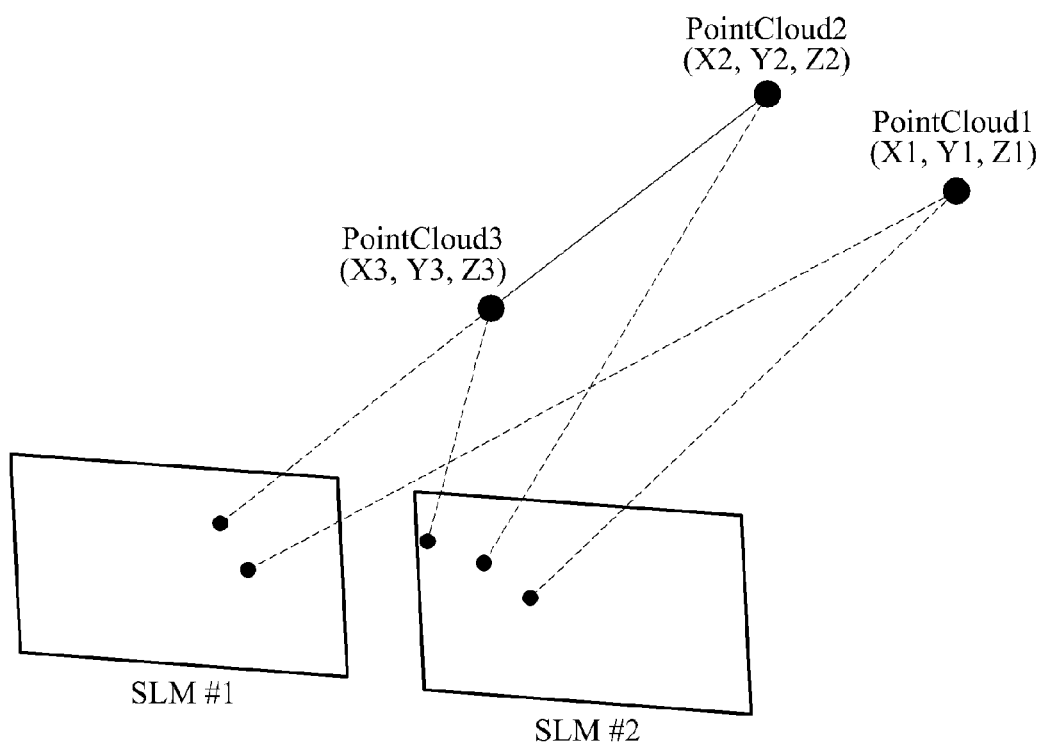
FIG. 2 is a diagram illustrating a procedure of calculating a projection position of three-dimensional (3D) data according to an example embodiment of the present invention.

Descriptions related to the hologram generation method determining the projection position will be provided in detail with reference to FIG. 2.

In operation 130, the hologram generation method may generate an FZP pattern in a first SLM. In operation 140, the hologram generation method may accumulate the generated FZP pattern to an SLM differing from the first SLM. For example, the hologram generation method may reuse the FZP pattern generated in the first SLM in another SLM.

In the hologram generation method, an FZP pattern may be generated for non-processed 3D data among 3D data to be visualized relative to a reference viewpoint. The generated FZP pattern may be calculated and accumulated on a hologram plane related to each of all viewpoints other than the reference viewpoint and pre-processed viewpoints, based on the projection position and whether the visibility is present. The aforementioned operation may be repetitively performed until all of the 3D data to be visualized relative to the reference viewpoint is processed.

Thus, the hologram generation method may verify whether all viewpoints are processed. When a result of the verifying indicates that all of the viewpoints are processed, the hologram generation method may be terminated. When a result of the verifying indicates that non-processed viewpoints remain, the hologram generation method may set one of the non-processed viewpoints as the reference viewpoint. The hologram generation method may reuse an FZP pattern of the reference viewpoint in a non-processed SLM.

In an example, a viewpoint vertically or horizontally closest to a reference viewpoint most immediately processed among the non-processed viewpoints may be set as the reference viewpoint.

Operations of FIG. 1 may be performed in various orders as well as the aforementioned order and thus, those skilled in the art will appreciate that performing the operations through a combination within a range of one operation result not affecting another operation result in an actual implementation is possible. For example, an operation of calculating a projection position, generating an FZP pattern, and reusing the generated FZP pattern may be repetitively performed for each 3D data in lieu of generating a wide viewing angle hologram based on an inter-viewpoint redundancy, the procedure in which all 3D data is processed in each operation, a result of the processing is stored in a memory, and then a subsequent operation is performed.

FIG. 2 is a diagram illustrating a procedure of calculating a projection position of 3D data according to an example embodiment of the present invention.

Referring to FIG. 2, a hologram generation method may project 3D data onto a hologram plane for each SLM, thereby calculating a projection position and verifying whether a visibility is present.

As an example, when a binocular holographic display system is provided through a tiling in a 2×1 form, 2×1 SLMs, for example, an SLM#1 and an SLM#2 may be used and thus, hologram planes corresponding to two viewpoints may be defined.

The hologram generation method may project the 3D data, for example, a PointCloud1, a PointCloud2, and a PointCloud3, onto each of a plurality of SLMs, for example, the SLM#1 and the SLM#2, thereby calculating the projection position and verifying whether a visibility is present.

In FIG. 2, the PointCloud1 and the PointCloud3 may be visibly calculated for one SLM, for example, the SLM#1. The hologram generation method may calculate a projection position of the PointCloud1 and the PointCloud3 on a hologram plane corresponding to the SLM#1. The hologram generation method may store the calculated projection position.

Since the PointCloud2 is verified to be invisible due to the PointCloud3 obscuring the PointCloud2 in the SLM#1, the hologram generation method may not calculate the projection position.

For another SLM, for example, the SLM#2, all of the 3D data, for example, the PointCloud1, the PointCloud2, and the PointCloud3, may be visualized. Accordingly, the hologram generation method may calculate the projection position of the PointCloud1, the PointCloud2, and the PointCloud3 on a hologram plane corresponding to the SLM#2, and store the calculated projection position.

Figure 3:
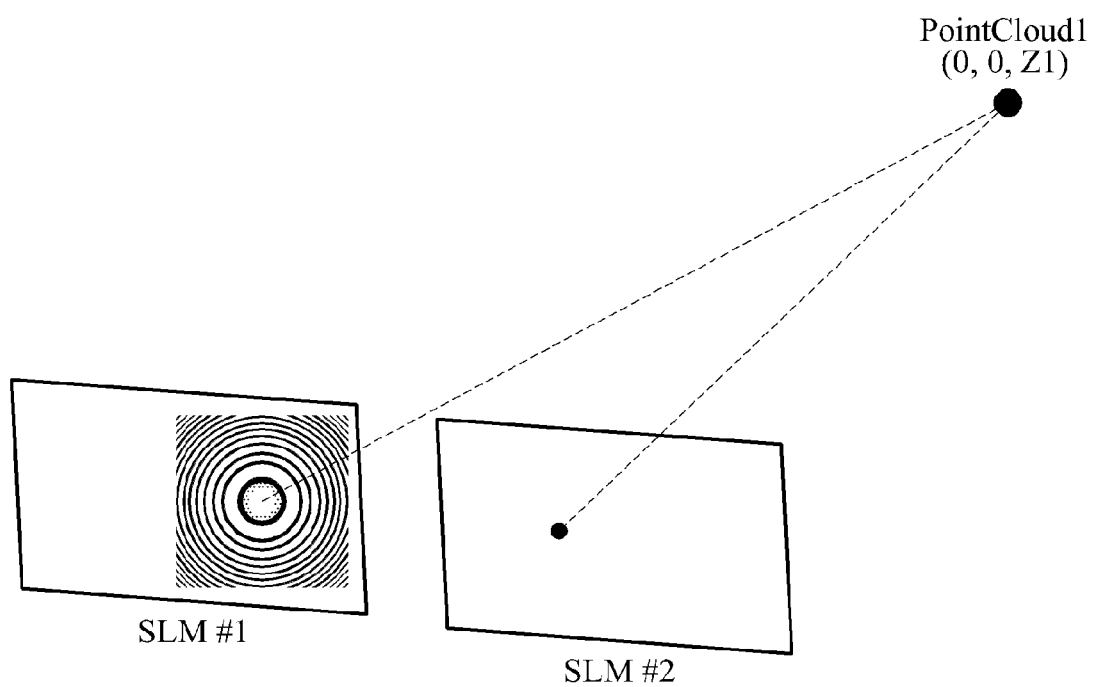
FIGS. 3 and 4 are diagrams illustrating an example of generating and reusing a Fresnel zone plate (FZP) pattern according to an example embodiment of the present invention.
Figure 4:
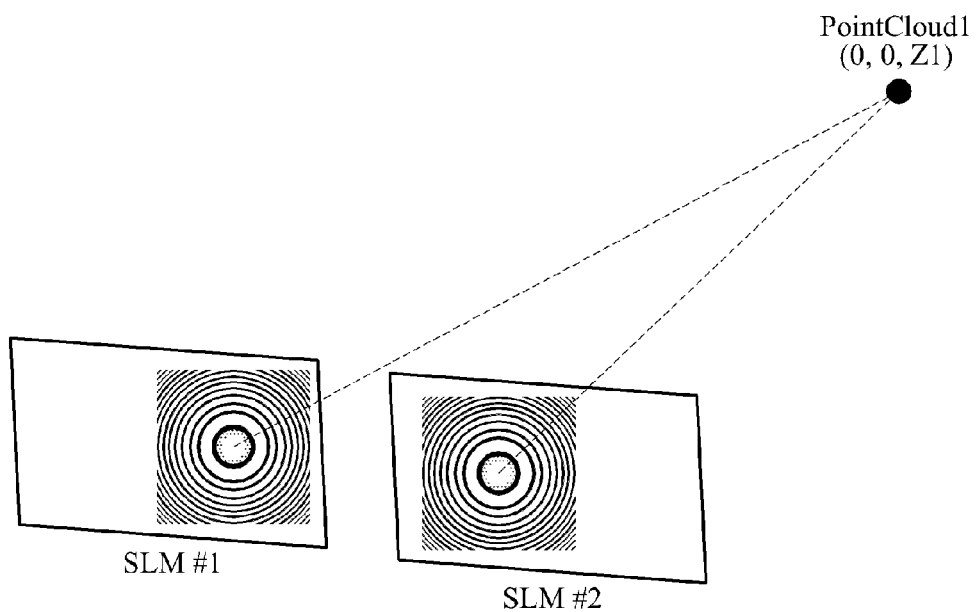

FIGS. 3 and 4 are diagrams illustrating an example of generating and reusing an FZP pattern according to an example embodiment of the present invention.

Referring to FIG. 3, a hologram generation method may generate an FZP pattern corresponding to one item, for example, PointCloud1 of 3D data for one SLM, for example, an SLM#1. FIG. 3 illustrates an example of generating an FZP pattern for one item of 3D data to be visualized relative to a reference viewpoint. In this example, the reference viewpoint may be an SLM, for example, the SLM#1. In an example, as illustrated in FIG. 3, an FZP pattern may be generated for non-processed 3D data, for example, PointCloud1, among the 3D data to be visualized relative to the reference viewpoint, on a plane of the SLM#1 corresponding to the reference viewpoint.

Referring to FIG. 4, the hologram generation method may reuse the generated FZP pattern on another SLM, for example, an SLM#2.

FIG. 4 illustrates an example of calculating and accumulating the generated FZP pattern on a hologram plane related to each viewpoint based on a projection position and whether a visibility is present, for all viewpoints other than the reference viewpoint and pre-processed viewpoints. In an example, the FZP pattern on the plane of the SLM#1 corresponding to the reference viewpoint of FIG. 3 may be calculated and accumulated on a plane of the other SLM, for example, the SLM#2 with reference to FIG. 4. The aforementioned operation may be repetitively performed until all 3D data relative to the reference viewpoint is processed. Thus, when the operation is repetitively performed on 3D data, for example, a PointCloud3, the reference viewpoint may be changed and set to be the SLM#2.

Figure 5:
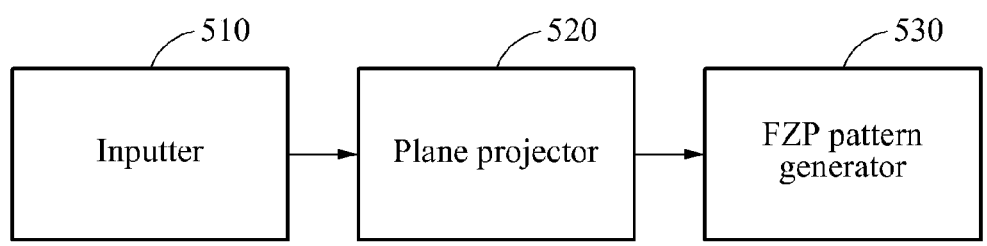
FIG. 5 is a block diagram illustrating an apparatus for generating a wide viewing angle hologram based on an inter-viewpoint redundancy according to an example embodiment of the present invention.

FIG. 5 is a block diagram illustrating an apparatus 500 for generating a wide viewing angle hologram based on an inter-viewpoint redundancy according to an example embodiment of the present invention. Hereinafter, the apparatus 500 may also be referred to as a hologram generation apparatus 500. The hologram generation apparatus 500 may include an inputter 510, a plane projector 520, and an FZP generator 530.

The inputter 510 may receive 3D data information associated with a scene and a target object to be represented by a holographic 3D image. The plane projector 520 may project the 3D data information received from the inputter 510 onto a hologram plane corresponding to each SLM for indicating each viewpoint, thereby calculating 3D data to be visualized and a projection position of the 3D data on the hologram plane. When M×N SLMs are used, hologram planes corresponding to M×N viewpoints may be defined, and thus projections may be performed on all of the 3D data M×N times. In this example, verification whether a visibility is present may be performed to verify whether the 3D data is to be visualized on each of the hologram planes or invisible due to other 3D data obscuring the 3D data. When the 3D data is verified to be visualized, the hologram generation method may calculate a position onto which the 3D data is projected on a corresponding hologram plane. The FZP pattern generator 530 may generate an FZP pattern for non-processed 3D data among 3D data to be visualized relative to a reference viewpoint. Also, the FZP pattern generator 530 may calculate and accumulate the generated FZP pattern on a hologram plane related to each of all viewpoints other than the reference viewpoint and pre-processed viewpoints, based on the projection position and whether the visibility is present. The aforementioned operation may be repetitively performed until all of the 3D data to be visualized relative to the reference viewpoint is processed. When a processing of all of the 3D data to be visualized relative to the reference viewpoint is completed, whether all viewpoints are processed may be verified. When a result of the verifying indicates that all of the viewpoints are processed, the operation may be terminated. When a result of the verifying indicates that non-processed viewpoints remain, one of the non-processed viewpoints may be set as the reference viewpoint and the operation may be performed repetitively.

According to an aspect of the present invention, it is possible to provide a hologram generation method and apparatus for generating a hologram at a high speed through a reuse of a hologram pattern for a plurality of viewpoints. By using the hologram generation method and apparatus, a new pattern may be generated through an reuse of a hologram pattern based on a redundancy between viewpoints. Through this, a hologram generation may be performed at a high speed.

According to another aspect of the present invention, it is possible to provide a wide viewing angle hologram generation method and apparatus based on an inter-viewpoint redundancy. In the wide viewing angle hologram generation method and apparatus, when a wide viewing angle hologram is realized by configuring a plurality of SLMs in an M×N matrix form, a hologram may be generated by reusing an FZP based on the inter-viewpoint redundancy in a process of calculating M×N hologram patterns to be represented using the SLMs without need to calculate the FZP again, thereby generating the hologram at a high speed.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A hologram generation method comprising:
receiving three-dimensional (3D) data information;
determining a first projection position onto which the 3D data information is projected on a hologram plane corresponding to a first spatial light modulator (SLM), and a second projection position onto which the 3D data information is projected on a hologram plane corresponding to a second SLM;
generating a first Fresnel zone plate (FZP) pattern corresponding to the first projection position; and
reusing the first FZP pattern as a second FZP pattern for the second projection position, when the first FZP pattern is determined to be the second FZP pattern corresponding to the second projection position.

2. The method of claim 1, further comprising: verifying a visibility of the 3D data information for the hologram plane corresponding to each of the first SLM and the second SLM.

3. The method of claim 1, wherein the 3D data information comprises at least one of information associated with a scene and a target object to be represented by a holographic 3D image.

4. The method of claim 1, further comprising: verifying whether FZP patterns are generated for all SLMs corresponding to the 3D data information.

5. The method of claim 4, further comprising:
setting, when a third SLM for which an FZP pattern is not generated is present, a reference SLM corresponding to the third SLM; and
applying an FZP pattern of the reference SLM to be the FZP pattern of the third SLM.

6. The method of claim 5, wherein the reference SLM is an adjacent SLM of the third SLM.

7. The method of claim 1, wherein each of the first SLM and the second SLM corresponds to a different viewpoint.

8. A hologram generation apparatus comprising:
an inputter configured to receive three-dimensional (3D) data information;
a plane projector configured to determine a first projection position onto which the 3D data information is projected on a first spatial light modulator (SLM) and a second projection position onto which the 3D data information is projected on a second SLM; and
a Fresnel zone plate (FZP) pattern generator configured to generate a first FZP pattern corresponding to the first projection position, and reusing the first FZP pattern as a second FZP pattern for the second projection position, when the first FZP pattern is determined to be the second FZP pattern corresponding to the second projection position.

9. The apparatus of claim 8, wherein the plane projector is configured to verify a visibility of the 3D data information for the hologram plane corresponding to each of the first SLM and the second SLM.

10. The apparatus of claim 8, wherein the 3D data information comprises at least one of information associated with a scene and a target object to be represented by a holographic 3D image.

11. The apparatus of claim 8, wherein the FZP pattern generator is configured to verify whether FZP patterns are generated for all SLMs corresponding to the 3D data information.

12. The apparatus of claim 11, wherein when a third SLM for which an FZP pattern is not generated is present, the FZP pattern generator is configured to set a reference SLM corresponding to the third SLM, and apply an FZP pattern of the reference SLM to be the FZP pattern of the third SLM.

13. The apparatus of claim 12, wherein the reference SLM is an adjacent SLM of the third SLM.

14. The method of claim 8, wherein each of the first SLM and the second SLM corresponds to a different viewpoint.

15. A hologram generation method comprising:
receiving three-dimensional (3D) data information;
calculating 3D data visualized on a hologram plane corresponding to each spatial light modulator (SLM) for indicating a corresponding viewpoint;
calculating a projection position of the visualized 3D data on the hologram plane; and
reusing a first Fresnel zone plate (FZP) pattern of a hologram plane of a pre-processed reference viewpoint as a second FZP pattern for a hologram plane of a non-processed viewpoint, when the first Fresnel zone plate (FZP) pattern of a hologram plane of a pre-processed reference viewpoint is determined to be the second Fresnel zone plate (FZP) pattern of a hologram plane of a non-processed viewpoint.

* * * * *